(12) United States Patent
Biest et al.

(10) Patent No.: US 8,240,617 B2
(45) Date of Patent: Aug. 14, 2012

(54) VARIABLE DAMPING OF HAPTIC FEEDBACK FOR A FLIGHT-ATTITUDE CHANGING LINKAGE OF AN AIRCRAFT

(75) Inventors: Romuald Biest, Lombex (FR); Bernard Gemmati, Lauris (FR); Julien Pruss, Aix en Provence (FR)

(73) Assignee: Eurocopter, Marignane Cedex (FR)

( * ) Notice: Subject to any disclaimer, the term of this patent is extended or adjusted under 35 U.S.C. 154(b) by 271 days.

(21) Appl. No.: 12/836,646

(22) Filed: Jul. 15, 2010

(65) Prior Publication Data

US 2011/0024551 A1  Feb. 3, 2011

(30) Foreign Application Priority Data

Jul. 28, 2009  (FR) ...................................... 09 03690

(51) Int. Cl.
*B64C 13/46* (2006.01)
*B64C 13/04* (2006.01)
*B64C 13/38* (2006.01)
*B64C 27/57* (2006.01)
*B64C 27/82* (2006.01)
*G05D 1/08* (2006.01)

(52) U.S. Cl. ............ 244/223; 244/6; 244/221; 244/230; 244/17.13; 244/17.19; 701/3; 701/4

(58) Field of Classification Search .................. 244/194, 244/4 R, 7 R, 189, 190, 180, 221, 223, 232, 244/235, 17.13, 17.19; 701/1, 3, 4, 5, 11; 340/945, 963, 967, 974, 975
See application file for complete search history.

(56) References Cited

U.S. PATENT DOCUMENTS

| 2,665,859 A | | 1/1954 | Papadakos |
| 3,332,643 A | * | 7/1967 | Toner ............................. 244/7 R |
| 3,385,537 A | | 5/1968 | Lichten et al. |
| 3,765,624 A | | 10/1973 | Kaniuka |
| 4,488,851 A | * | 12/1984 | Young ............................. 416/33 |

(Continued)

FOREIGN PATENT DOCUMENTS

EP    0384806 A1    8/1990

(Continued)

OTHER PUBLICATIONS

Search Report and Written Opinion; Application No. FR 09 03690; dated Mar. 22, 2010.

*Primary Examiner* — Timothy D Collins
*Assistant Examiner* — Marc Burgess
(74) *Attorney, Agent, or Firm* — Brooks Kushman P.C.

(57) ABSTRACT

The present invention relates to haptic feedback for operating at least one manual flight control device (21) for controlling the cyclic pitch of the blades (5) of a rotary wing (4) of a hybrid helicopter (1) via power assistance (27). Said operations of said control device (21) are defined according to a predetermined damping force relationship (A) that is a function of an instantaneous load factor of the hybrid helicopter (1) in such a manner that the instantaneous load factor is maintained between its minimum and maximum limit values in proportion to a position of a thrust control member (20) between its minimum and maximum thrust values (23, 22).

16 Claims, 2 Drawing Sheets

U.S. PATENT DOCUMENTS

| | | | | |
|---|---|---|---|---|
| 5,125,602 A | * | 6/1992 | Vauvelle | 244/223 |
| 5,131,603 A | * | 7/1992 | Meyers | 244/17.19 |
| 5,213,282 A | * | 5/1993 | Gold et al. | 244/17.13 |
| 5,428,543 A | * | 6/1995 | Gold et al. | 701/5 |
| 5,908,177 A | * | 6/1999 | Tanaka | 244/223 |
| 6,334,592 B1 | * | 1/2002 | Tomio et al. | 244/221 |
| 7,108,232 B2 | * | 9/2006 | Hoh | 244/223 |
| 7,438,259 B1 | * | 10/2008 | Piasecki et al. | 244/6 |
| 2008/0065278 A1 | * | 3/2008 | Shultz et al. | 701/3 |
| 2008/0156939 A1 | * | 7/2008 | Hanlon et al. | 244/223 |
| 2008/0294305 A1 | * | 11/2008 | Roesch | 701/3 |

FOREIGN PATENT DOCUMENTS

| | | |
|---|---|---|
| EP | 1348622 B1 | 10/2003 |
| FR | 2476013 A1 | 12/1980 |
| FR | 2864028 A1 | 6/2005 |
| FR | 2916418 A1 | 11/2008 |
| FR | 2916419 A1 | 11/2008 |
| FR | 2916420 A1 | 11/2008 |
| GB | 722247 A | 1/1955 |
| WO | 2006137908 A2 | 12/2006 |
| WO | 2008052094 A2 | 5/2008 |

* cited by examiner

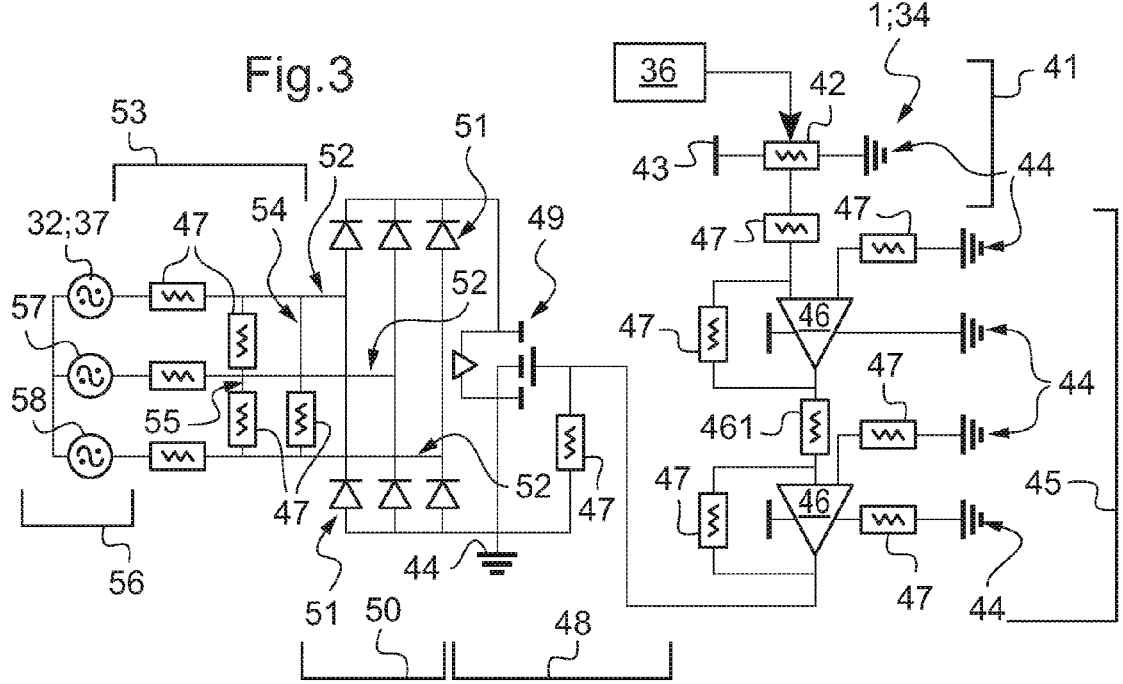
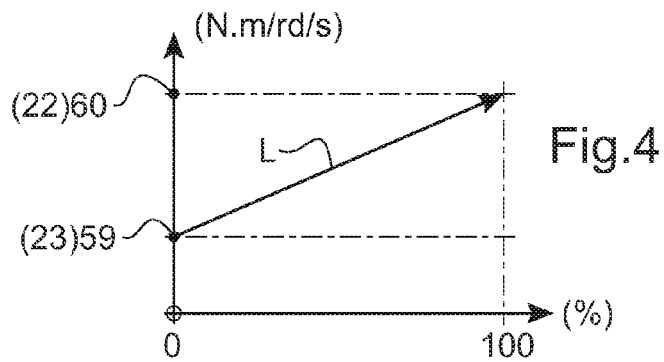
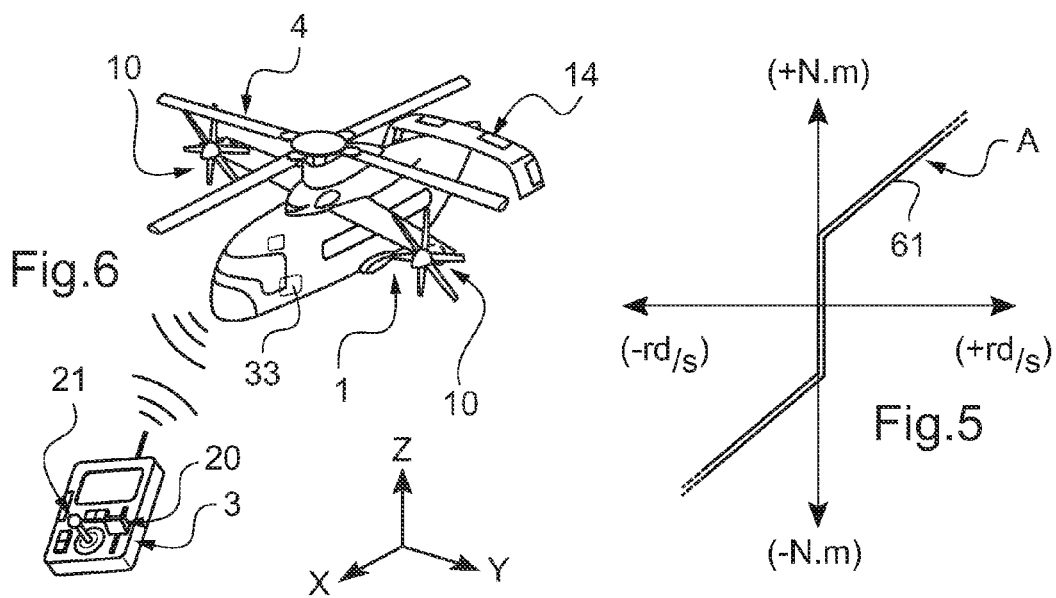

VARIABLE DAMPING OF HAPTIC FEEDBACK FOR A FLIGHT-ATTITUDE CHANGING LINKAGE OF AN AIRCRAFT

CROSS REFERENCE TO RELATED APPLICATION

This application claims the benefit of FR 09 03690 dated Jul. 28, 2009, the disclosure of which is incorporated herein by reference.

FIELD OF THE INVENTION

The present invention relates to variable-coefficient damping of haptic feedback in a manual flight control acting on a flight-attitude changing linkage of an aircraft.

In the examples, the invention is described in the context of cyclic pitch control of the blades of a rotary wing of a so-called "hybrid" type helicopter.

BACKGROUND OF THE INVENTION

A hybrid helicopter is an advanced aircraft concept for vertical takeoff and landing (VTOL). Embodiments of such a hybrid helicopter are described for example in documents FR 2 916 418, FR 2 916 419, and FR 2 916 420.

The hybrid helicopter combines at reasonable cost the effectiveness in vertical flight of a conventional helicopter with high-speed performance on a longitudinal flight path, e.g. having a cruising speed of the order of 400 kilometers per hour (km/h) or even more, and also with a large operating range.

From a structural point of view, a hybrid helicopter is remarkable in three aspects in particular.

Thus in forward flight, a fraction of the lift of a hybrid helicopter is provided by a rotary wing in the form of at least one main rotor, having an axis of rotation or mast that is not tiltable, unlike the main rotors of a convertible aircraft such as a Bell-Boeing V22 Osprey.

This distinguishes a hybrid helicopter not only from such convertible aircraft, but also and by definition from fixed wing aircraft. A hybrid helicopter should thus be considered as being a rotary wing aircraft of a new generation.

For the sake of simplicity, the term "rotary wing" is used herein for the rotor(s) providing such an aircraft with lift, and the term "rotor disk" is used for the geometrical surface swept by such a rotor.

Nevertheless, in addition to its rotary wing, a hybrid helicopter also has a so-called "fixed" wing, e.g. in the form of two half-wings extending transversely on either side of a fuselage.

The fixed wing provides a fraction of the lift in forward flight, with this fraction increasing with increasing forward speed of the hybrid helicopter.

On either side of the fuselage and transversely at a distance therefrom, there is provided at least one propulsion arrangement, typically in the form of at least one thrust propeller, for increasing forward speed. At least one engine unit such as a turbine engine simultaneously drives rotation of the rotary wing, typically a main rotor, and of the propulsion arrangements.

In addition, the propulsion arrangements produce longitudinal stabilization torque, since they are operated to provide differential thrust. The hybrid helicopter therefore does not need to have an anti-torque tail rotor.

Nevertheless, a hybrid helicopter is provided with stabilizer and directional control airfoil surfaces of the tail plane and rudder type.

Another distinct aspect of a hybrid helicopter is that a transmission system interconnects the rotary wing, the engine units, and the propulsion arrangements in a manner that is proportional, with constant ratios in terms of speeds of rotation.

This distinguishes a hybrid helicopter from an autogyro such as that produced by La Cierva, from a compound helicopter such as the S010 Farfadet, or indeed a gyrodyne such as the Fairey Jet Rotodyne, where the main rotor in all those aircraft is in autorotation under the effect of the forward speed while the aircraft is flying along a flight path.

By modifying the pitch of the blades of the propellers of the propulsion arrangements collectively and by the same amount, it is also possible to control the forward thrust of said hybrid helicopter as generated by those arrangements.

However, because of the high forward speeds that a hybrid helicopter can reach, it is subjected to an increased risk of pitching-up, a form of behavior that is explained below.

The technical field of the invention is thus the narrow technical field of flight controls for a hybrid helicopter.

In this field, document FR 2 476 013 describes a device enabling a flight control surface to be moved to a large extent at low flying speed and to restrict this movement at higher speed. For this purpose, an adjustment member limits the movement of control means for being moved by a pilot, as a function of a signal derived from dynamic pressure.

Document FR 1 132 452 also describes a device for restricting the movement of a flight control surface at high speed. That document makes provision, as a function of the forward speed of the aircraft, for limiting the effects of a movement of control means on a control surface, such that identical movements of the control means give rise to different movements of the control surface as a function of said forward speed.

Although they are of interest, those solutions appear to be poorly adapted to the very particular context of a hybrid helicopter.

Mention may also be made of document EP 1 918 196 that describes an airliner control stick system that presents force-weighted feedback, known as "haptic" feedback.

The greater the speed of the airplane, the greater the feedback, from any given position of the control stick and of the airfoil surfaces of the airplane that are associated therewith.

Those airfoil surfaces are moving control surfaces hinged to the wings of the airplane's fixed wing. Various factors influencing the feedback are taken into consideration, including the extent to which the stick is moved, the slew rate capacity of the airfoil surfaces, and also the load capacity thereof.

A flight control unit is coupled to a motor via a control circuit in order to deliver at least one feedback force trigger signal so as to define the slew rate capacity of the airfoil surfaces of the airplane.

Document EP 0 384 806 also describes a device for controlling elements of a flying machine, the device including a stick mounted to pivot about at least one transverse axis. The stick is associated with at least one position sensor that delivers an electrical signal representative of the pivoting of said stick about said axis. This electrical signal controls at least one of said elements of the machine via calculation means. The device includes at least one torque motor associated with said axis to deliver rotary drive between the rotor and the stator of said torque motor, as a function of the calculation means.

Document U.S. Pat. No. 3,765,624 describes an artificial force feedback system that is independent of the positions of trim actuators. That system generates forces opposing movement of the controls that depend on linear and angular accelerations of the aircraft, and also on Mach number. A safety device comprising an inertial mass, a spring, and a damper is provided also to oppose movement of the controls, e.g. by handling a stick.

Document WO 2006/137908 describes a mechanical flight control system (MFCS) dedicated to adjusting the cyclic pitch of the blades of a main rotor of a rotary wing aircraft and referred to as a cyclic control system (CCS). An autopilot system referred to as an automatic flight control system (AFCS) incorporates the cyclic adjustment. That mechanical control system presents an upstream portion, a downstream portion, and amplifier means arranged to connect the upstream and downstream portions together.

Concentric actuators with valves and various load-limiting parameters are described. That document relates to the damping or force relationship at gain that is constant, i.e. that does not vary.

Document WO 2008/052094 describes an active man-machine interface that is implemented without a force detector, but with a neutral position detector and with a signal being produced that is representative of said position. That document thus attempts to give feedback to the pilot that reproduces a feeling informing the pilot of the stresses applied at any given moment to the control members the pilot is using.

Various types of sensor are mentioned, either analog or digital, such as Hall effect sensors, optical sensors, or rotary variable differential transformers (RVDTs).

Document EP 1 348 622 describes a control device for an aircraft control surface that includes a variable-resistance damper.

That document EP 1 348 622 describes controls for flight control surfaces, the device being of the type that is active in the sense that a variable-resistance damper reduces the pilot's authority when the frequency with which flight control movements are applied by the pilot increases. That damper includes a damper motor. That document does not describe a hybrid helicopter. Nor does it provide for a damping force relationship that is predetermined as a function of an instantaneous load factor on the aircraft being controlled.

Now that those documents have been mentioned, it is easier to set out the various technical problems on which the invention is based.

From the above, it can be understood, that as a result in particular of the forward speeds of a hybrid helicopter, which speeds are higher than those of an ordinary rotary wing aircraft, and of the relative complexity of the functional equilibria that need to be provided in order to optimize such an aircraft in flight, it has been preferred to fit certain controls of hybrid helicopters with power assistance mechanisms.

Such assistance mechanisms adjust the state of airfoil surfaces such as rotors, propellers, control surfaces or rudders as a function of control signals. Depending on circumstances, such assistance mechanisms have power sources, generally of the hydraulic type for servo-controls, whereas for autopilot control it is electrical actuators that are usually involved.

The control signals are generated either by the actions of the human pilot on the controls of the hybrid helicopter, or by an autopilot, or they are made up from a combination of signals of human and automatic origin.

A known drawback of power-assisted controls of the at least partially manual type is that they do not feed back to the control member operated by the pilot the forces that are applied at any given instant on the airfoil surfaces. Depending on circumstances, manual flight control members may be levers, sticks, knobs, etc.

With a hybrid helicopter, such control members are generally located in the cockpit of the aircraft.

Under such conditions, the way in which the cyclic pitch of the blades of the rotary wing is adjusted is usually designed so that the cyclic stick remains anchored, without pilot intervention, in a compensated equilibrium position referred to as "neutral".

When the cyclic stick is in this neutral position, cyclic adjustment of the main rotor by a cyclic control system (CCS) defines a new equilibrium position for control of the aircraft.

The main mechanical characteristics of a CCS depend on the forces perceived by the pilot via the cyclic stick while the pilot is moving it.

Typically, the characteristic forces that relate to a CCS type adjustment in a standard helicopter with mechanical flight controls can be reduced to:

- anchor forces that are applied to recenter the stick to its neutral or trim position, these forces being constant regardless of the amplitude or the speed with which the cyclic stick is moved;
- auxiliary forces for recentering the cyclic stick towards its neutral position, these forces being proportional to the departure of the stick from the neutral position;
- a constant friction force that opposes movements of the stick;
- a force that is proportional to the speed with which the stick is moved, in order to mitigate maneuvers that are too rough; and
- a stop force for stopping movement in an established position as a function of flying condition limits, with this being embodied by a kind of abutment that is normally retracted.

An autopilot system serves to act on the cyclic stick control by automatically adjusting its neutral position. It is common practice to include a member for releasing the neutral or trim position in the cockpit or in a remote pilot control station, which member is typically located on the handle of the cyclic stick. This button enables the pilot to move the stick to any position and to request the autopilot to maintain this new position once said button has been released.

Also usually, a five-state switch including a stable central state enables the neutral position or attitude of the helicopter to be modified in the four cardinal directions. Also conventionally, it must be possible for the pilot to direct the helicopter without unclutching the above-mentioned forces.

It should be observed that conventionally, the cyclic stick of a helicopter enables such an aircraft to be controlled in pitching and in roll, and theoretically in independent manner, i.e. without a pitching operation having an interfering influence on the attitude of the aircraft in roll, and vice versa.

In other words, if the pilot seeks to perform a maneuver in pitching only, control is transmitted to the rotary wing via a pitching flight-attitude changing linkage without having any influence of the roll flight-attitude changing linkage that is also operated by the cyclic stick.

Similarly, a pilot seeking to perform a maneuver in roll only should not lead to the cyclic stick acting on the pitching flight-attitude changing linkage.

Furthermore, it is recalled that an arbitrary operation on the cyclic stick enables the attitude of a rotary wing aircraft to be changed simultaneously in pitching and in roll.

However, it commonly happens that downstream from the two independent linkages for pitching and for roll, both stemming directly from the cyclic stick, parameters that are imposed for enabling the aircraft to fly give rise to changes in the pitch, roll, or even yaw attitude even though the pilot is acting on said control stick in pitching only or in roll only.

That said, it can be understood that manual controls with power assistance, such as those acting on the pitch, yaw, and roll positions of an aircraft prevent the pilot from naturally feeling the feedback forces returned by the airfoil surfaces to the corresponding control member.

However, these feedback forces represent various stresses to which the aircraft is being subjected in a manner that is perceptible to the touch, i.e. in a manner that is said to be "haptic". As a result, if the pilot has no tactile sensation representative of these reaction forces, then the pilot is prevented from perceiving a risk of danger if the structural or functional limits of the aircraft are close or are being exceeded.

Furthermore, the forces imposed on the airfoil surfaces of a hybrid helicopter depend in particular on its instantaneous flying conditions. Specifically, its load factor and its forward speed along its flight path are involved, which speed is commonly referred to as "flight path air speed" or more simply "air speed" below.

The maximum load factor that an aircraft can accept while turning or pulling-out is a function of the instantaneous speed of the aircraft and also of the radius of curvature of the flight path.

This radius of curvature of the flight path in pitching, i.e. about an axis extending in a transverse direction, whether pitching-down or pitching-up, is particularly pertinent for determining such a limiting load factor. Similar observations apply in roll.

In order to prevent a limit load factor being exceeded, the longitudinal cyclic pitch control needs to be provided with a damping force relationship that is more representative of the proximity of such a limiting load factor.

As mentioned above, it is common practice to produce such a damping force relationship on the basis of the speed with which the corresponding manual control flight device is moved by the pilot, and/or of the speed of the aircraft.

Furthermore, there is a connection between load factor limits and the risk of a rotary wing aircraft pulling-up. Conventionally, a tendency to automatically pull-up takes two forms.

More precisely, automatic pull-up may be understood as longitudinal instability as from a certain angle of incidence, with a possibility of pull-up divergence (variation in nose-up attitude) of the fuselage or airframe of the aircraft.

In particular, automatic pull-up occurs when the tilt angle of the rotary wing towards the rear is too great (flat angle of the blades too great in the front zone of the rotor disk). It is found under such conditions that the movements relative to the center of gravity of the aircraft of gravity forces, of lift forces, and also of drag forces are no longer in mutually opposite directions.

In addition to the attitude divergence of the aircraft, such excessive tilting can lead to a rate of pull-up pitching that tends to increase the load factor of the aircraft.

If a cyclic pitch control is operated at low frequencies, e.g. by slow movements of the manual flight control device, then the aircraft responds in a quasi-steady mode, i.e. without variation of attitude. As a result, it is possible to preserve an angle of tilt that is small enough to avoid automatic pull-up.

Conversely, if a sensitive flight control, e.g. a pitching (or roll) flight control, is actuated at high frequency, i.e. by moving the manual flight control member quickly, then the fuselage, so to speak, does not have enough time to follow and tilting tends to increase significantly, which can lead to rates of pitching that are unacceptable, or even dangerous.

Pitching-up thus has the consequence of applying an excessive load factor to the aircraft compared with its flying limits.

Unfortunately, this phenomenon is all the more penalizing and even dangerous with increasing speed of the aircraft.

In an attempt to prevent pitching-up, the movements of the manual flight control device and in particular the pitching control device, need to be properly damped, by a haptic feedback force opposing these movements and sensed by the pilot.

However, particular tests have made it possible to determine that prior art solutions for providing haptic feedback do not make it possible to mitigate the problems described above for a hybrid helicopter, in particular when it reaches air speeds of the order of 400 km/h, for example, or even more.

Furthermore, those tests have served to determine the sensitive controls for which an appropriate force return haptic feedback effect is most critical, namely the pitching controls in particular and to a lesser extent the roll and/or yaw controls.

In addition, selecting appropriate damping for the movements of manual flight control devices ought to make a hybrid helicopter more accurate and more comfortable to pilot.

Because of increasing compliance with flight limits as imposed by the load factor, it ought to be possible to further improve the safety in flight of a hybrid helicopter. Another expected consequence is that the lifetime of a hybrid helicopter will certainly be improved as a result of its component parts in question suffering less damage.

In addition, for increased reliability of a hybrid helicopter, it would be desirable for appropriate damping of the movements of its manual flight control devices to be independent of similar functions that are performed by the autopilot.

For this purpose, the invention is defined in the claims.

SUMMARY OF THE INVENTION

In one aspect, the invention provides a method of providing haptic feedback in response to operating at least one manual flight control device that is suitable for giving rise to adjustments in the cyclic pitch of the rotary wing of a hybrid helicopter including the control device, with the adjustments taking place via power assistance.

The hybrid helicopter in question comprises at least: a fuselage, said rotary wing, a fixed wing, and two anti-torque differential thrust propulsion arrangements that are disposed symmetrically on either side of the fuselage.

These thrust arrangements are controlled between a minimum thrust value (in theory zero) and a maximum thrust value by means of a manual thrust control member. The hybrid helicopter also includes an autopilot suitable for acting on the power assistance for adjusting the cyclic pitch of the blades of the rotary wing, said operations on the manual flight control device being damped by haptic feedback that is defined in accordance with a predetermined damping force relationship.

In this aspect, said damping force relationship applied to operating the manual control device is predetermined as a function of an instantaneous load factor of the hybrid helicopter in such a manner that the instantaneous load factor is kept between its minimum and maximum limit values, in proportion to the position of said manual thrust control device between its minimum and maximum thrust values.

More precisely, said predetermined damping force relationship corresponds to delivering an opposing torque that is due to a damper, e.g. a rotary damper incorporated in the flight-attitude changing linkage on which the pilot acts via the manual flight control device that is subjected to haptic feedback.

For example, said predetermined damping force relationship applied to operations on said manual control device is obtained by applying an opposing torque that is exerted by a damper on said attitude changing linkage, with a damping coefficient of said damper that is itself variable according to a "damping coefficient variation" relationship.

The damping coefficient variation relationship is itself predetermined as a function of the mean collective pitch stroke of the blades of the propellers of said thrust arrangements.

In various embodiments, said manual control device with damped operation acts on the attitude of the hybrid helicopter in pitching and/or roll and/or yaw.

Depending on circumstances, said airfoil surfaces then form part of the rotary wing of the aircraft, with the cyclic pitch thereof being under pilot control, and/or engine arrangements and/or a set of stabilizer and rudder surfaces.

When said manual control member is ordering thrust at said minimum or even zero value, the collective pitch of said propellers of the propulsion arrangements is at a minimum and said damping coefficient used by the damper as defined by said predetermined damping coefficient variation relationship lies substantially in the range 2.5 newton meters per radian per second (Nm/rd/s) to 3.5 Nm/rd/s. In an embodiment, a minimum thrust damping coefficient of about 3.18562 Nm/rd/s has been measured.

This coefficient for the damping produced by the damper when said control member is ordering thrust at its maximum value, is then at a maximum and lies substantially in the range 13.5 Nm/rd/s to 14.5 Nm/rd/s. In an embodiment, the damping coefficient at maximum thrust has been measured at about 14.3354 Nm/rd/s.

This predetermined damping force relationship that is exerted on the flight control device, e.g. a rod or a crank of the flight-attitude changing linkage that is subjected to haptic feedback, does indeed result from dividing said opposing torque by the distance between the linkage and the point where the torque is applied.

Under such conditions, the damping coefficient or the coefficient representative of the opposed resistance is the torque that results from applying a speed of one radian per second (rd/s) to the rotary portion of the damper.

In an embodiment, the rotary damper is constituted by an alternator that feeds electricity into an opposing electric circuit connected to its terminals, so as to produce a back electromotive force (EMF).

In another embodiment, said manual control device with damped operation acts on the behavior of the hybrid helicopter in pitching.

In an embodiment, said manual control device with damped operation acts on the behavior of the hybrid helicopter in roll and/or in yaw.

In an embodiment, said predetermined force relationship for damping movements of the manual flight control device corresponds to a damping coefficient that varies in application of a predetermined variation relationship linearly between 0% and 100% of the stroke of the collective pitch rods for the propeller blades (or of similar means, such as a drive plate, . . . ). This collective pitch stroke of the propeller blades is also referred to as the thrust collective control or as the thrust control lever (TCL) parameter.

For example, a minimum thrust relating to a TCL parameter of 0%, i.e. a minimum mean collective pitch for the propeller blades, corresponds to a damping coefficient of the order of 3.2 Nm/rd/s. Maximum thrust corresponding to a TCL parameter equal to 100% is associated with a damping coefficient of the order of 14.3 Nm/rd/s. Under such circumstances, the mean collective pitch of the propeller blades is at a maximum.

The above-mentioned damping coefficient values are relative to the characteristics of the above-mentioned rotary damper, and they are not exclusive. Variation in the coefficient corresponds to a predetermined linear relationship referred to as the damping coefficient variation relationship.

In an implementation, when said manual control member orders thrust at said minimum (or even zero) value, the damping defined in application of the predetermined damping force relationship is also at a minimum. In contrast, the damping obtained when said manual control member is ordering thrust at said maximum value is itself at a maximum value.

In an embodiment, said cyclic pitch adjustments of the blades of rotary wing of the hybrid helicopter are obtained with the help of said power assistance, said assistance being defined at least in part by the autopilot, independently of said predetermined damping force relationship that serves to damp movements of the manual flight control device.

For example, the movements of the manual control member act directly and/or via power assistance on the thrust adjustment, with this adjustment being delivered to the autopilot, and with the autopilot then responding by adapting at least one flight parameter such as an engine speed for the engine unit.

This adaptation in return gives rise to a step of defining an assistance setpoint for adjusting the cyclic pitch of the blades of the rotary wing, in a manner that is indirect and thus independent.

In an implementation, said minimum and maximum load factor limit values and/or said minimum and maximum thrust values are calibrated as a function of pitch-up limits of the hybrid helicopter.

In another aspect, the invention also provides a hybrid helicopter, in which a damper serves to implement the method, and that includes at least one damping motor.

A haptic feedback system is provided for acting on movements of at least one manual flight control device suitable for causing adjustments to the cyclic pitch of the blades of a rotary wing of a hybrid helicopter via power assistance.

By way of example, the system is suitable for implementing the above-described method.

In this aspect of the invention, in order to predetermine the predetermined damping force relationship that defines the damping applied by said haptic feedback in proportion to a position of said manual flight control member, between the minimum and maximum thrust values, the hybrid helicopter incorporates at least one flight-attitude changing linkage to which said predetermined damping force relationship applies in parallel with another flight-attitude changing linkage that acts on thrust.

In an embodiment, the damper system includes mechanical assistance dedicated to said flight-attitude changing linkage that is subjected to damping and in parallel it includes mechanical assistance dedicated to said flight-attitude changing linkage that acts on thrust.

This mechanical assistance to flight control is connected functionally firstly to a manual flight control device such as a lever and secondly to the airfoil surfaces of the rotary wing via swashplates for operating the main rotor, while in parallel, said mechanical assistance for thrust control is connected functionally firstly to said control member and secondly to mechanisms for adjusting the pitch of the propeller blades of said propulsion arrangements.

In an embodiment, said flight-attitude changing linkage that acts on thrust includes at least two pivoting crank hinges, and at one of these hinges it includes at least one position sensor functionally connected to said manual flight control member so as to produce an electric signal indicative of the position of said member between said minimum (or even zero) and maximum thrust values. For example, the position sensor may be a rotary variable differential transformer (RVDT) sensor.

It should be observed that in certain embodiments, the position sensor produces information representative of variation over the range 0% to 100% for thrust, defined as the above-described TCL parameter.

In an embodiment, said flight-attitude changing linkage to which the damping is applied includes at least two pivoting crank hinges. At one of these pivoting crank hinges, at least one rotary damper of the movements of said manual flight control device is embodied in the form of an alternator that is connected in such a manner as to deliver electricity to an opposing electronic circuit that is connected to the terminals of said alternator in such a manner as to produce a back emf that is proportional to the speed of rotation of said hinge receiving the damper.

In an implementation, the manual control device is functionally coupled to a movement speed sensor suitable for producing a movement speed signal proportional to the instantaneous speed at which the manual control device is actuated, said speed signal being incorporated as a variable in the predetermined damping force relationship.

In certain embodiments, the movement speed is sensed by a member incorporated in the damper (e.g. an alternator) and/or by a member that is distinct from the damper.

For example, the damper system includes at least one position sensor (i.e. a sensor of a state relative to maximum stroke) relating to said manual flight control device, a movement damper, and optionally a speed sensor, which sensors and damper are functionally connected to define damping directly as a function of the predetermined damping force relationship.

In another example, the system includes a computer having connected thereto at least one sensor for sensing the position of said manual thrust control member, a movement damper, and optionally a sensor of the movement speed of said manual flight control device.

In yet another aspect, the invention provides a hybrid helicopter suitable for implementing the damping method and/or including at least one damper system as described above.

In an embodiment, the hybrid helicopter is a drone having a remote piloting station that is not on board, and it includes at least one flight control member with haptic feedback and a thrust control device having its instantaneous position taken into consideration by said predetermined damping force relationship.

BRIEF DESCRIPTION OF THE DRAWINGS

The invention and its advantages appear in greater detail in the following description of embodiments given by way of illustration and with reference to the accompanying figures, in which:

FIG. 3 is a symbolic summary representation of an electrical circuit for controlling a flight-attitude changing linkage with haptic feedback for a hybrid helicopter in accordance with the invention and including, from right to left, an engine zone, a minimum load processing zone, a rectification processing zone, a zone for processing the variable load that is provided with a field effect transistor, a zone for signal shaping, and a zone for picking up the instantaneous position of the control on the linkage in question;

FIG. 4 is a graph showing an example of values defined by a predetermined relationship for varying the damping coefficient in accordance with the invention, plotting the percentage in the range 0% to 100% of the thrust demand requested by the pilot via a control member along the abscissa, and the actual damping coefficient applied to a manual flight control device in a hybrid helicopter of the invention up the ordinate;

FIG. 5 is a graph showing the continuity without any transition point in the relationship for the predetermined damping force on a manual flight control device with haptic feedback in accordance with the invention, values of instantaneous angular operating speeds of the manual flight control device being plotted along the abscissa between a maximum extreme position and a minimum extreme position, and with the ordinate defining the damping torque that is fed back; and FIG. 6 is a diagram showing an embodiment of a hybrid helicopter in accordance with the invention in the form of a drone, possessing a piloting control station that is remote and not on board, including in particular a flight control member with weighted reaction or haptic force feedback and a thrust controlling device.

DETAILED DESCRIPTION OF THE PREFERRED EMBODIMENT

Figure 1:
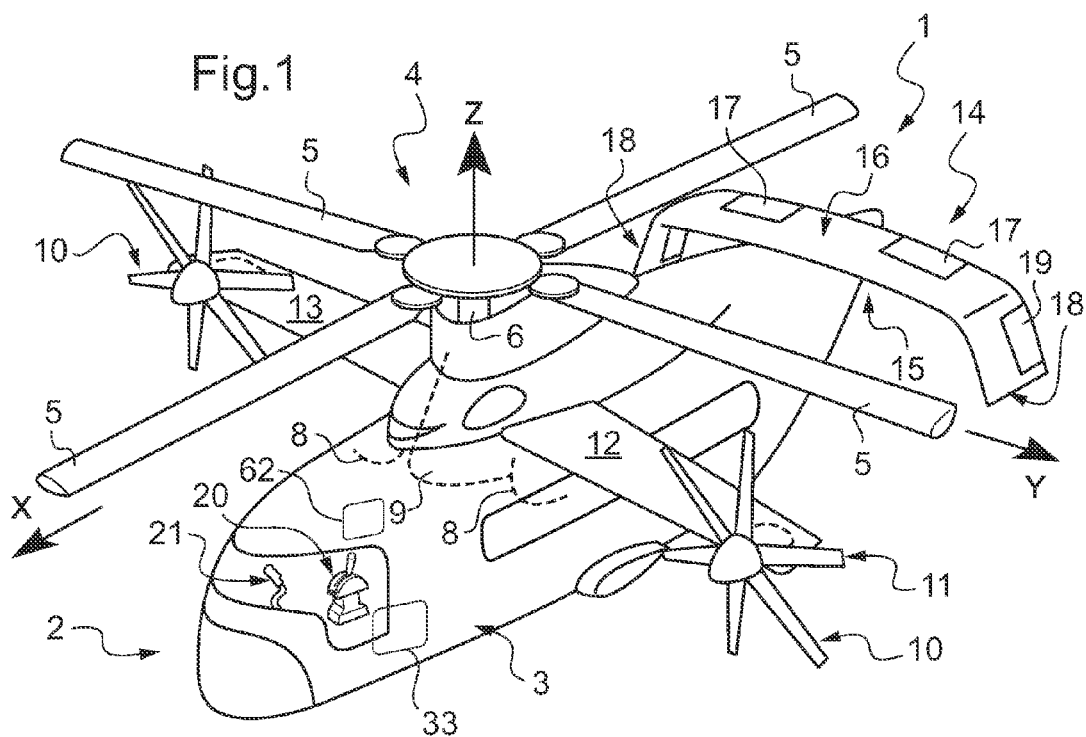
FIG. 1 is a diagrammatic perspective view in longitudinal elevation from above and in front, showing a hybrid helicopter in accordance with the invention, having a cockpit that is fitted firstly with a flight control that is to be damped and secondly with a thrust control device.
Figure 2:
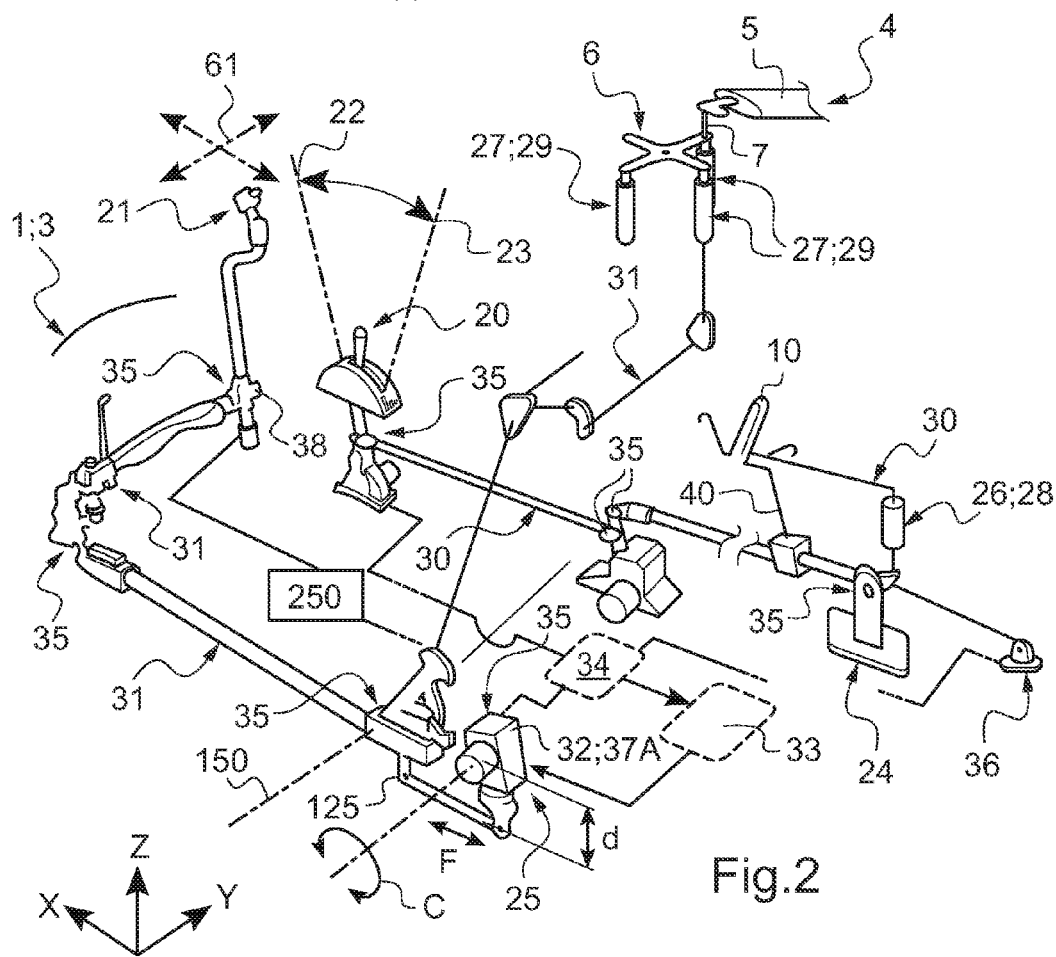
FIG. 2 is a fragmentary and diagrammatic perspective view in longitudinal elevation as seen from above and behind, showing the equipment within the cockpit of a hybrid helicopter in accordance with the invention, showing firstly, towards the rear, a thrust flight-attitude changing linkage that acts on the pitch of the propulsion propellers, and secondly, towards the front, a roll-pitch flight-attitude changing linkage that acts on the swashplates controlling the inclination of the disks of a main rotor.

Three mutually orthogonal directions X, Y, and Z are shown in FIGS. 1 and 2.

A "longitudinal" direction X corresponds to the lengths or main dimensions of the structures described. Thus, the main component of the flight path speed or of the forward thrust extends in this direction X. In aviation, this direction X generally corresponds to the roll axis of an aircraft.

Another direction, a "transverse" direction Y corresponds to the widths or lateral dimensions of the structures described. The longitudinal direction X and the transverse direction Y are sometimes said to be horizontal, for simplification purposes.

For example, the spacing from the fuselage of each above-mentioned thrust arrangement is measured essentially along this direction Y. In aviation, this transverse direction Y generally corresponds to the pitch axis of an aircraft. It is also relative to this direction Y that the terms "left" and "right" are defined, e.g. to distinguish between each of the propulsion arrangements.

A third direction Z is said to be an elevation direction and corresponds to the height dimensions of the structures described: the terms up/down are relative thereto. Sometimes, this elevation direction Z is said to be vertical. For simplification purposes, it is assumed above that the axis of rotation of the main rotor of a hybrid helicopter extends substantially in this elevation direction Z. In aviation, this elevation direction Z generally corresponds to the yaw axis of an aircraft.

The directions X and Y together define a "main" X,Y plane (linearly intersecting the plane of the sheet in FIG. 1) within which there is inscribed a lift polygon and a landing plane.

It is also recalled that, in conventional manner, a cyclic pitch control for the blades of the rotary wing of an aircraft such as a helicopter acts on the attitude of the aircraft about these two directions X and Y, respectively in roll and in pitching.

In the figures, the reference 1 is an overall reference for a modern rotary wing aircraft of the hybrid helicopter type.

As described in documents FR 2 916 418, FR 2 916 419, and FR 2 916 420, the hybrid helicopter 1 comprises a fuselage 2 with a cockpit 3 located at the front thereof.

A rotary wing, here in the form of a main rotor 4, serves to drive the blades 5 in rotation, there being four blades in the example shown in FIG. 1.

From this figure, it can be understood that an axis of rotation of the main rotor 4, and thus of its drive mast, may be considered as being generally permanently maintained along the elevation direction Z, ignoring small amplitude trim adjustments of the blades 5, some of which are mentioned below.

A swashplate arrangement given overall reference 6 is also shown, in FIG. 2. This swashplate arrangement 6 is suitable for modifying the positions of pitch rods 7 that themselves act on the angles of incidence of the blades 5, in a manner that is conventional in the field of helicopters.

By acting on the angles of incidence of these blades 5, it is possible for the pilot to change the flying attitude in roll and in pitch of the hybrid helicopter 1 by using the rotor 4. These changes are not without influence on the danger of the hybrid helicopter 1 automatically pitching up, as mentioned above.

Numerical reference 9 designates a main transmission gearbox (MGB, in French "BTP"), drawn in dashed lines in FIG. 1, for transferring power from the power plant to the rotor 4 and to the thrust arrangements 10.

Furthermore, the hybrid helicopter 1 also includes two engine units 8 disposed transversely relative to each other within the fuselage 2 on either side of a longitudinal plane of symmetry in elevation of the aircraft 1.

In FIG. 1, these two engine units 8 are in the form of turbine engines, respectively left and right engines, and they are not directly visible because of the presence of fairing.

Each engine unit 8 is connected to a propulsion arrangement 10 by the main gearbox 9 (MGB).

Firstly, these two engine units 8 rotate the rotary wing constituted by the rotor 4, in particular via the main gearbox 9.

Secondly, each of these engine units 8 carries and drives the propulsion arrangement 10 in rotation.

Each of these propulsion arrangements 10 is essentially in the form of a propeller having blades of adjustable pitch in order to modify thrust.

Each of the left and right propulsion arrangements is mounted on an axis of rotation that is substantially longitudinal (direction X in FIGS. 1 and 2). More precisely, each of the propulsion arrangements is mounted on a side of the fuselage 2 that is transversely opposite from the side of the other propeller and propulsion arrangement 10. It should be observed that each propulsion arrangement 10 has an axis that is substantially stationary.

As mentioned above, in a hybrid helicopter 1, the propellers of the arrangement 10 together produce longitudinal stabilization torque because they operate in differential thrust.

As a result, they serve not only to contribute to propelling the hybrid helicopter 1, but also to providing an anti-torque function so as to stabilize it longitudinally.

Furthermore, the hybrid helicopter 1 is provided with a fixed wing 11 made up of two half-wings 12 and 13, one on the left and the other on the right. In the example shown in FIG. 1, these two half-wings 12 and 13 are disposed substantially at a high level in elevation (direction Z) of the fuselage 2. The fixed wing 11 is thus said to be a high wing.

The thrust arrangements 10 are arranged respectively on the left and the right of the fuselage 2 on the half-wing 12 and on the half-wing 13. Each thrust arrangement 10 is mechanically connected to the main gearbox 9 (MGB) and it is also connected inside the half-wings 12 and 13 for control purposes to structures that are not shown.

At substantially the same level as the fixed wing 11 in the elevation direction Z, the hybrid helicopter 1 has a set of stabilizer and control surfaces 14 located close to a rear portion 15 of the fuselage 2.

In this example, the assembly 14 is generally in the form of an upside-down U-shape, and for pitch-changing control it presents a horizontal stabilizer 16 with two pitch control surfaces 17 that are movable relative to a stationary front portion of the horizontal stabilizer 16.

For controlling changes in the flying direction of the hybrid helicopter 1, the assembly 14 has two substantially vertical fins 18 at opposite sides of the horizontal stabilizer 16, i.e. at its outer transverse ends. Each fin 18 has a rudder control surface 19 mounted to move relative thereto.

In order to control the advance of the hybrid helicopter 1, the pilot has in particular a manual thrust control member given reference 20. This member 20 acts in conventional manner to modify the mean pitch of the blades of the propellers of the thrust arrangements 10.

In FIGS. 1 and 2, the manual control member 20 is arranged in the cockpit 3.

Still in FIGS. 1 and 2, it should be observed that a cyclic pitch lever acting in particular as a manual flight control device 21 is located in the cockpit 3 of the hybrid helicopter 1 close to the manual thrust control member 20.

This manual flight control device 21 acts either on changes of attitude in pitching, or on changes of attitude in roll of the hybrid helicopter 1.

Juxtaposing these types of control is unusual for conventional modern helicopter pilots, since adjusting forward thrust does not require a dedicated control member in other types of rotorcraft.

For other types of rotorcraft, such as conventional helicopters, thrust is produced solely by tilting the rotary wing, and it is controlled via the cyclic pitch lever and the associated swashplates, with helicopters that have turbine engines also including automatic regulation between the pitch and the power delivered so as to avoid the rotor braking when the general pitch of the rotor blades is increased, thereby increasing lift, and simultaneously drag, and consequently the amount of power required.

This manual flight control member 20 is sometimes referred to as a TCL, by analogy with the manual thrust controls of airplanes, for example.

In a hybrid helicopter 1, the control member 20 acts in identical manner on the pitches of the blades of both propellers of the arrangement 10 so as to obtain collective variation of said pitches. For example, the pilot might request an increase of 5° of pitch in all of the propellers of the arrangement 10 so as to increase the resulting longitudinal thrust, as generated in particular by the propellers.

It can thus be understood that this thrust from the propellers of the arrangement 10 is adjustable by means of the control member 20 between two extreme positions 22 and 23.

A first extreme position 22 towards the front is considered as being 100%. A second extreme position 23 towards the rear is considered as being 0%. These first and second extreme positions 22 and 23 correspond respectively to a maximum value and to a minimum value of thrust, where the minimum value is in principle zero.

It should nevertheless be understood that when hovering, in a hybrid helicopter 1, the 0% position 23 nevertheless maintains a certain amount of differential thrust, in particular to provide the anti-torque function.

FIG. 2 shows some of the equipment in the cockpit of a hybrid helicopter 1 in accordance with the invention.

This figure shows mainly, firstly a linkage 24 for changing flight attitude in thrust, where the linkage 24 acts on the pitches of the blades of the propellers of the propulsion arrangements 10.

Secondly the figure shows a linkage 25 for changing flight attitude that acts on the swashplates 6 for adjusting the cyclic pitch of the blades of the rotary wing formed by the main rotor 4.

As specified above, depending on the movements applied to the manual control device 21, the pilot can act on the attitude of the hybrid helicopter 1 in pitching and in roll.

Conventionally, longitudinal movements of the device 21, forwards and/or rearwards, cause the hybrid helicopter 1 to change attitude in pitching, respectively nose-down or nose-up.

Transverse movements of the device 21, to left and/or to right, cause the hybrid helicopter 1 to change attitude in roll, respectively to left and to right.

Each of the flight-attitude changing linkages 24 and 25 includes respective power assistance 26 and 27. These power assistances 26 and 27 are implemented in this example in the form of one or more hydraulic actuators 28 and 29 that are continuously activated.

In general, the flight-attitude changing linkages 24 and 25 include in particular other actuators, such as so-called "trim" actuators for autopilot control. In general, such trim actuators are of the electrical and parallel type. Still further actuators, e.g. actuators that are electrical and in series, are arranged in such flight-attitude changing linkages 24 and 25.

In FIG. 2, it can be seen that the swashplates 6 of the rotary wing 4 co-operate with a plurality of actuators 29, including two transverse actuators 29 for roll adjustments, and a central actuator 29 for pitching adjustments.

Briefly, the flight-attitude changing linkage 24 comprises, in conventional manner in the field of aviation, and starting from its manual control member 20: rodding 30 including various cranks and hinges leading firstly to the assistance 26; followed by a conventional mechanism for adjusting the pitches of the blades in each propeller propulsion arrangement 10.

Similarly, the flight-attitude changing linkage 25 comprises, in a manner that is conventional in the field of rotorcraft, and going from its manual flight control device 21 in the form of a so-called "cyclic" stick, for changes of attitude in pitch: rodding 31 including various cranks and hinges 35 that terminate firstly at a pitch damper 32, and then at assistance 27, and finally at conventional swashplates 6 for adjusting the cyclic pitch of the blades 5 of the rotary wing 4.

For reasons of clarity, only those components of the manual flight control linkage 25 that act on pitching are shown in FIG. 2.

For further details concerning the structure and the operation of conventional equipment for (non-hybrid) helicopter cockpits, reference may be made to document FR 2 864 028, which relates to a flight control enabling a pilot to put a single-engined rotorcraft into autorotation in the event of an engine breakdown.

Before describing the operation of the invention, it is specified that the hybrid helicopter 1 is fitted in conventional manner with an autopilot 33 that is represented by dashed lines in FIGS. 1 and 2.

The autopilot 33 is connected to an electronic logic circuit 34 so as to be suitable for acting on the power assistance 27 for adjusting the cyclic pitch of the blades 5 of the main rotor 4. This action of the autopilot 33 is based in particular on the instantaneous air speed of the hybrid helicopter 1.

In certain helicopters, e.g. light helicopters, the connection with the autopilot (AP) is not provided. In addition, it is appropriate to distinguish this connection from a load factor servo-control. When the autopilot 33 acts on the power assistance of the cyclic pitch of the rotary wing 4, it is parameters that are representative of the load factor that determine the predetermined damping force relationship.

For example, these parameters are the propulsive pitch (determined by the member 20) and the speed at which the device 21 is being moved, which are both taken into account when determining the predetermined damping force relationship.

Nevertheless, movements of the manual flight control device 21 are damped by haptic feedback defined in application of a predetermined damping force relationship that is specific to the invention and that is designated by the reference "A" (with the result thereof being shown in FIG. 5).

It should be observed that this predetermined damping force relationship A is linear without discontinuity, in theory and ignoring imperfections of the system.

So far as the pilot is concerned this results in actuation of the manual flight control device 21 becoming harder (presenting variable stiffness), with this effect being introduced by applying an opposing torque that is due to the damping structure 32 coupled to said manual flight control device.

In the embodiment shown, this structure is a rotary damper, and is consequently likewise referenced 32, and it is located in the linkage 25 for changing flight attitude in pitching.

Still with reference to FIG. 2, there can be seen another embodiment of a damping structure coupled to the manual flight control device, which structure is indicated diagrammatically by chain-dotted line 150.

In this embodiment, a damper motor similar to the motor 32 is arranged directly on the hinge axis of a crank in the flight-attitude changing linkage in question.

In FIG. 2, this torque is represented by arrow C. This torque C generates, in one direction of rotation or in the opposite direction, a damping force that is designated by F in said FIG. 2. Because of the predetermined relationship for varying the coefficient L (FIG. 4), this damping force F is linear and acts on the linkage 25 for changing flight attitude in pitching.

This damping force F also complies with the predetermined damping force relationship A and it is applied in the example shown to a connecting rod 125 in the linkage 25 for changing flight attitude in pitching.

Naturally, as a result the pilot feels a haptic feedback force 61, also referred to as a "damping force", as shown in FIG. 2 or in FIG. 5 (being plotted in FIG. 5 in Nm/rd/s).

This haptic feedback force 61 that results from the predetermined damping force relationship A acts on the manual flight control device 21 that is dedicated to pitching, i.e. the cyclic pitch stick. This action of the haptic feedback force 61 is clearly proportional to the damping force F and is directed in a corresponding direction.

Naturally, the haptic feedback force 61 also depends, in terms of direction, speed, and acceleration, on the design of said linkage to which it is applied for changing flight attitude.

One of the purposes of this variable stiffening is to prevent the pilot issuing a control instruction that is too rough, e.g. running the risk of leading to conditions in which the aircraft pitches up.

In other words, said predetermined damping force relationship A acting on movements of the manual flight control device 21 is predetermined in this example as a function of an instantaneous load factor of the hybrid helicopter 1 so that the instantaneous load factor is maintained between its minimum limit value and its maximum limit value.

Overall, the variable stiffness of the actuation of said manual flight control device 21 presents in particular an initial component generated by the assistance 27 for a prior state, a variable component that is specific to the haptic feedback defined in accordance with said predetermined damping force relationship A in accordance with the invention, and Naturally a component that is substantially constant and due to the friction in said flight control linkage 25.

The same applies for haptic feedback in roll, that involves a linkage 250.

Such a predetermined damping force relationship A applies, depending on the embodiment of the invention, to the linkage for changing flight attitude in pitching and/or in roll.

In order to avoid being directly tied in the definition of this variable component that is to be generated iteratively and in real time to the actions of the autopilot 33 that are based on the instantaneous air speed of the hybrid helicopter, the invention has recourse to an external parameter (the TCL parameter), i.e. the instantaneous position of the manual thrust control member, as described in greater detail below.

In an implementation of the invention, the predetermined damping force relationship A is defined in proportion to a position of said manual thrust control member 20 that lies between its two extreme positions 23 and 22 that correspond respectively to a minimum value of thrust while hovering (in theory zero) and a maximum thrust value that can be accepted by the propulsion arrangements 10.

Together, the various logical and physical means implemented for this purpose form a haptic feedback system.

With this haptic feedback system, in order to predetermine the predetermined damping force relationship A in proportion to a position intermediate between the minimum extreme position 23 and the maximum extreme position 22 of said manual control member 20, the flight attitude control linkage 25 to which said predetermined damping force relationship A is to be applied is incorporated in the hybrid helicopter 1 in parallel with the flight-attitude changing linkage 24 that acts on thrust.

It is recalled, that according to the invention, this haptic system also applies to a linkage 250 that acts on the attitude of the hybrid helicopter 1 in roll.

In the embodiment of FIG. 2, said linkage 24 for changing flight attitude in thrust includes at least two crank pivot hinges 35. The haptic feedback system presents a thrust control position sensor 36 at the hinge 35 situated at the rear of the linkage 24.

This sensor 36 is functionally connected to said control member 20 so as to produce an electric signal that is indicative of the position of said member 20 between its minimum and maximum thrust values. For example, the sensor 36 may be of the RVDT type, or it may be of the potentiometer type, for example.

Still in the embodiment of FIG. 2, the linkage 25 for changing flight attitude in pitching includes amongst the crank pivot hinges 35 a damper 32 for damping movements of said manual flight control device 21.

In FIG. 2, the damper 32 comprises a motor used inversely, i.e. as an alternator 56. In this example, the alternator 56 that constitutes the damper 32 possesses a plurality of alternator stator windings referenced 37, 57, and 58.

In this example, which appears to be the presently preferred example, the damper 32 of movements for modifying thrust delivered by the propulsion arrangements is thus constituted by an alternator 56. This alternator 56 has its terminals connected in such a manner as to deliver electricity into the opposing electronic logic circuit 34 so as to produce a back emf that is proportional to the speed of rotation of said hinge 35 that receives the damper 32. As a result, it is not essential to have a member for measuring said speed.

By inverse operation, it should be understood that the pilot applies input movements to the manual flight control device 21, thereby causing the alternator 56, i.e. its windings 37, 57, and 58, to deliver a voltage that is a function of the speed of said movement that is to be damped.

This proportional back emf contributes to braking the manual flight control device 21, and constitutes the variable component of the haptic feedback torque.

In other implementations, a sensor 38 is provided that is dedicated to measuring speed. Such a sensor 38 either takes the place of or else acts in addition to some other speed measuring member. As shown in FIG. 2, the sensor 38 is associated with the hinge 35 to determine its speed of rotation.

Thus, in the alternative example of FIG. 2, the manual flight control device 21 is functionally coupled to such a movement speed sensor 38. The sensor 38 produces a movement speed signal that is proportional to the instantaneous speed at which the manual flight control device 21 is being actuated.

This speed signal from the sensor 38, or the signal coming from the alternator 56, is incorporated as a parameter (referred to above as the "external" parameter) for the predetermined damping force relationship A by means of an electrical connection that connects said sensor 38 to the logic circuit 34.

Thus, the haptic feedback system includes its sensor 36 that is suitable for supplying the instantaneous position of said manual flight control member 20. In addition, the haptic feedback system includes the motor 37 that is also referred to as the "damper" motor or the "rotary" motor, elsewhere.

As explained above, the function of this motor 37 is to damp the movements of the manual flight control device 21. In addition, the haptic feedback system includes the sensor 38 that measures the speed of said manual flight control device 21.

All of these components of the haptic feedback system are functionally connected to the electronic logic circuit 34 in order to define damping directly as a function of the predetermined damping force relationship A.

This haptic feedback system logically terminates at the manual flight control device 21 where it brakes it in the direction of the flight control movement applied thereto by the pilot, i.e. it acts in opposition thereto.

This braking initially takes the form of a damping force F in application of said predetermined relationship L for variation in the damping coefficient, e.g. applied to the connecting rod 125 of the flight-attitude changing linkage 25. In this configuration, the damping force F is substantially equal to the torque delivered by the damper motor 37 divided by the length of the lever arm, written d in FIG. 2. This lever arm d is measured between the axis of rotation of said damper motor 37 and the connecting rod 125.

It should be observed at this point that the sensors and/or 38 are of the rotary variable differential transformer type. In other implementations, the sensors 36/38 may either be analog or digital, such as Hall effect sensors, optical sensors, or the like.

In another example, the system includes a computer (shown diagrammatically at 62 in FIG. 1) having connected thereto at least one sensor 36 for sensing the position of said manual control member 20, a damper 32 for damping movements, and optionally a speed sensor 38.

Below, the invention is explained in functional terms, i.e. in terms of the stages and steps of the haptic feedback method during movements of the manual flight control device 21.

As an initial point, it is recalled that by means of the power assistance 27 the manual flight control device 21 and the autopilot 33 act on the cyclic pitch of the blades 5 of the main rotor 4. It is only indirectly that the movements of the manual control member (TCL) 20 serve to brake said manual flight control device 21.

Without going into details, it is also emphasized that in the hybrid helicopter 1 of FIG. 2, movements on said manual thrust control member 20 do not act only indirectly on adjusting the thrust via a power assistance 26.

As can be seen in FIG. 2, movements of the manual thrust control member 20 may act directly on adjusting thrust via a direct or a derived channel 40.

The autopilot 33 is informed of this adjustment of the thrust control and responds by adapting at least one flight parameter, such as an engine speed for the engine units 8.

This speed adaptation gives rise in this example to feedback and via the logic circuit 34 to the definition of a new assistance setpoint for adjusting the cyclic pitch of the blades 5 of the rotary wing, in a manner that is indirect, and thus independent.

Once more, in implementations, the logic circuit 34 is independent of the autopilot 33.

With reference to FIGS. 3 to 5, there follows a description of how movements of the manual flight control device 21 or controlling pitching are damped by haptic feedback defined in application of the predetermined damping force relationship A. This damping force relationship A is predetermined, as is the relationship for varying the damping coefficient L in the example of FIG. 4.

This description applies equally to haptic feedback for the roll flight controls, via the flight-attitude changing linkage 250.

From a logic point of view, FIG. 3 is a diagram summarizing an example of a logic circuit 34 for controlling the flight-attitude changing linkage 25 of the hybrid helicopter 1 in accordance with the invention.

In the description below, and for reasons of simplicity, the same references apply to all components that are identical or similar in the logic circuit 34, even if they have specifications, e.g. in terms of impedance, that may differ from one component of the same reference to another.

The input of the logic circuit 34 in FIG. 3 receives an instantaneous value for the position of the manual thrust control member 20. This value is supplied to a zone 41 for capturing said instantaneous position value, between the front and rear extreme positions 22 and 23.

A signal representative of this instantaneous position is produced for example by the sensor 36 of the linkage 24. As described above, this sensor 36 may be of various types, including a potentiometer.

The capture zone 41 includes a variable resistor 42 connected in series between a direct current (DC) source 43 and one of the grounding points of the circuit 34, all of which are referenced 44.

At the output from the variable resistor 42 there is connected a signal shaping zone 45. This zone 45 serves to convert the position signal from the sensor 36 into a variable load setpoint.

For this purpose, the zone 45 includes in succession a series of two inverting amplifiers constituted by operational amplifiers 46 and by resistors 47. Each amplifier has its own power connection 43, its own ground connection 44, and an output. A resistor 461 can be seen between the two amplifiers 46 of FIG. 3.

The output from the zone 45 and thus from the second operational amplifier 46 leads in series to a zone 48 for variable load processing that is provided with a field effect transistor 49 having the function of controlling the load by means of electronic control. For example, the transistor 49 may be of the metal oxide on silicon field effect transistor (MOSFET) type.

A rectifier processor zone 50 is connected in series with the output from the variable load processor zone 48. The rectifier processor zone 50 comprises a parallel connection of two rows of diodes 51 connected in series, each having a distinct line junction 52. By means of the transformation performed by the rectifier processor zone 50, a current is obtained that is suitable for being applied via its specific connection line 52.

At the three outlets from the zone 50, the connection lines 50 form a minimum load processor zone 53.

A first bridge 54 of the minimum load zone 53 connects a line 52 to its opposite line 52, and includes in series a single resistor 47.

A second bridge 55 of this zone 53 connects together the lines 52 and includes a resistor 47 in series between each pair of lines 52. It can be understood that this processor zone 53 ensures a minimum thrust load coefficient.

For example, for a minimum thrust (rear extreme position 23) associated with a TCL parameter equal to 0%, i.e. a minimum mean collective pitch for the propeller blades, the damping coefficient is about 3.2 Nm/rd/s. For a maximum thrust associated with the TCL parameter equal to 100% (front extreme position 22), the damping coefficient is of the order of 14.3 Nm/rd/s. Under such circumstances, the mean collective pitch of the propeller blades is at a maximum.

In this example, the processor zone 53 ensures some minimum level of damping, for which the damping coefficient produced by the damper 32 (motor 37) is of the order of 3.1 Nm/rd/s to 3.2 Nm/rd/s. The position of the manual control member 20 is then at 0%, which corresponds to the rear extreme position 23.

Finally, there is a "motor" zone referenced 56. Each connection line 52 is dedicated to a respective "motor" component of the zone 56, i.e. to a damper acting on a specific linkage for changing flight attitude. As for the damper 32 of movements of the manual thrust control member 20, these dampers of the motor zone 56 produce a braking back emf that is proportional to the desired haptic feedback.

Not shown in FIG. 3, the damper 32 also includes a multiplier stage connected to the flight-attitude changing linkage 25 and a rotor of the alternator 56.

In this embodiment, the manual flight control device 21 with movement damping acts on the pitching behavior of the hybrid helicopter 1. This is merely an example, and the invention can naturally be applied to various flight-attitude changing linkages and to various types of aircraft.

Furthermore, in this embodiment, another manual flight control device 21 connected to the logic circuit 34 is subjected to movement damping by haptic feedback of the invention.

This haptic feedback is obtained by actuating another "motor" 57, and it acts on the roll behavior or indeed on the yaw behavior of the hybrid helicopter 1.

As an alternative, it is possible to envisage that one of the manual flight control devices 21 with haptic feedback of the invention acts on the roll of the hybrid helicopter 1. In such an example, this haptic feedback would be delivered by a motor of FIG. 3 operating inversely.

To summarize, it can be understood that the predetermined damping force relationship A that serves to define the weighting force values applied to movements of the manual flight control device 21 is pre-established as a function of an instantaneous load factor of the aircraft 1 to which the relationship A applies.

Such a predetermined damping force relationship A is pre-established so that said instantaneous load factor is maintained between its minimum and maximum limit values in proportion to a position of the manual thrust control member 20 (TCL) lying between its maximum and minimum extreme values and positions 22 and 23, where the minimum thrust value is theoretically zero.

In the configuration of FIG. 2, the predetermined damping force relationship A exerts a haptic feedback force F on the connecting rod 125, as mentioned above.

This haptic feedback force F is substantially equal to the torque C exerted by the damper 32 divided by the lever arm d between the axis of rotation of said damper and the corresponding hinge of said connecting rod 125.

Damping coefficients are variable with a damper 32 in the form of a motor 37. These coefficients correspond to the predetermined relationship L for varying the damping coefficient. An example of such a relationship L for varying the damping coefficient is shown in FIG. 4. For example, the damping relationship L and the predetermined damping force relationship A are stored in the computer 62 (FIG. 1).

In FIG. 4, this predetermined relationship L for variation in the damping coefficient used for weighting movements of the manual flight control device 21 relative to the position of the manual thrust control member 20 is thus substantially linear between 0% and 100% of the mean collective pitch stroke of the propellers of the propulsion arrangements 10.

Such a stroke is sometimes referred to as by the term "thrust collective control" or "TCL parameter", as mentioned above.

In the example of FIG. 4, for thrust referenced 59 relative to the extreme position 23 (rear position in FIG. 2) of the manual thrust control member 20 (TCL), which position is considered as being at 0%, i.e. the total thrust from the propellers of the arrangements 10 is theoretically zero, the damping coefficients produced by the damper 32 is of the order of 3.2 Nm/rd/s.

Naturally, if the total thrust from the propellers of the arrangements 10 is zero when hovering, the general architecture and the specific operation of the hybrid helicopter 1 still requires the propellers to produce differential thrust to counter the yaw torque generated by the rotary wing 4.

In this implementation, when said manual control member 20 orders thrust to take said minimum value 0%, i.e. when it is in the rear extreme position 23, the damping by the damping force relationship 1 that is produced by the motor 37 as a function of said predefined relationship L for varying the damping coefficient is at a minimum.

In contrast, the damping obtained by actuating the motor 37 when said manual control member 20 orders thrust at a maximum value of 100% (extreme forward position 22), corresponds to the haptic feedback braking itself being at a maximum.

Under such circumstances, said damping coefficient is about 14.3 Nm/rd/s, when the haptic effect from the damper 32 in accordance with the predetermined relationship L for varying the damping coefficient is at a maximum.

In this implementation, said adjustments of the cyclic pitch of the blades of the rotor 4 of the hybrid helicopter are caused by means of said power assistance 27, with said assistance 27 being defined at least in part by said autopilot 33, but independently of said predetermined damping force relationship A, i.e. indirectly after processing by the circuit 34, with no direct link with the movements imparted to the manual thrust control member 20.

In an implementation, said adjustments of the cyclic pitch of the blades 5 of the rotary wing 4 of the hybrid helicopter 1 are obtained via said power assistance, said assistance being defined at least in part by said autopilot 33, independently of said predetermined damping force relationship A that depends on the movements of the manual thrust control member 20.

For example, the movements of said manual thrust control member 20 act directly and/or via power assistance on the thrust adjustment, with the autopilot being informed of said adjustment, so that the autopilot then responds by adapting at least one flight parameter such as engine speed for the engine units 8, which adaptation gives rise in return to a new assistance setpoint being defined for adjusting the cyclic pitch of the blades 5 of the rotary wing 4, in a manner that is indirect and thus independent.

Depending on specific flight and structural features of the hybrid helicopter 1, said minimum and maximum limit values of the load factor are calibrated to avoid the hybrid helicopter 1 reaching limit states in which it has a tendency to pitch up.

With reference to FIG. 5, it can clearly be seen that the predetermined damping force relationship A is established so as to guarantee continuity without any transition dead point for the haptic feedback forces 61.

This serves to avoid any discontinuity or empty passage in which there is no haptic feedback in said manual control device 21 in the event of it being initially in one direction and then in the opposite direction, it being recalled that the flight control device 21 relates to attitude in pitching, and also in roll.

In the example of FIG. 5, damping force values 61 of the invention are plotted up the ordinate, and the speed at which a manual flight control device 21 moves in rotation is plotted along the abscissa, said device being subjected to the predetermined damping force relationship A.

Under such circumstances, the haptic feedback forces 61 define for example as a function of the torque C shown in FIG. 2 and fed back in the manual flight control device 21 as a force F, are continuously increasing or decreasing, even when the device 21 is actuated so as to reverse direction.

This reversal of the direction in which said manual control device 21 is moved is represented along the abscissa showing the instantaneous position in which the device 21 is moved between two extreme positions, a maximum position and a minimum position, with negative angle values to the left and positive values to the right.

In general, it can thus be understood that the invention is associated with the possibility of increasing forward travel speed, i.e. longitudinal speed along the direction X, as made possible by hybrid type rotary wing aircraft, e.g. as described in documents FR 2 916 418, FR 2 916 419, and FR 2 916 420.

At the high speeds reached by such hybrid helicopters, considerable stresses due to aerodynamic loads act on the wing surfaces, whether the wings are fixed or rotary.

As described above, these aerodynamic loads have effects that are both harmful and useful. It is clearly harmful to apply forces to the aircraft that are too close to its physical strength limits via these surfaces.

Conversely, ensuring that the pilot receives these aerodynamic loads via the flight controls of the aircraft 1 presents the advantage of warning the pilot that these strength limits are nearby. Consequently, the pilot is warned that it is preferable, or indeed urgent, to adjust the flight so as to reduce the loads.

However, when the flight controls are motor driven, e.g. with the help of actuation by hydraulic servo-control, the aerodynamic loads are no longer returned towards the controls, and as a result they can no longer be felt by the pilot. The pilot is thus no longer warned of an approaching situation of material fatigue or even of danger. As a result, the pilot runs the risk of not being in a position to take action.

This problem is particularly crucial for hybrid type rotary wing aircraft 1 that are capable of reaching air speeds and/or load factors that are considerable, and in which the controls of the airfoils are motor driven.

In such a situation, the hybrid aircraft runs the risk in particular of being confronted with an excessive and spontaneous tendency to pitch up.

A common and practical technique for seeking to limit the risks of a helicopter tending to pitch up is to feed back the effects of aerodynamic loads by applying artificial damped response constraints to the controls in a manner that is proportional to a greater or lesser extent.

Thus, if the load on an airfoil surface increases, feedback to the corresponding controls is likewise increased, and vice versa.

Typically, helicopters are fitted with constant gain feedback dampers, in particular given that their forward speed is relatively low compared with that of a rotary wing hybrid aircraft. Conventionally, such dampers are coupled to roll, pitching, and yaw controls.

With the invention, it is possible to solve novel problems that are encountered in hybrid helicopters 1 where it is appropriate to manage simultaneously: cyclic parameters of a rotary wing; differential forward thrust arrangements; and adjustments of stabilizer and control airfoil surfaces such as rudders and other control surfaces.

In FIG. 6, there can be seen in analogous manner an example of a hybrid helicopter 1 aircraft in accordance with the invention that is in the form of a drone.

This hybrid helicopter 1 drone possesses a control station 3, which station is not on board, i.e. it is at a distance from the fuselage 2.

This remote station 3 is fitted in such a manner as to be suitable for being actuated by a remote piloting operator (not shown), and it includes a flight control device 21 with weighted feedback, in this example acting on pitching orientation and/or roll orientation of the hybrid helicopter drone 1.

Force feedback in accordance with the invention is exerted on the device 21 so as to reproduce remotely the stresses to which the airfoil surfaces of the helicopter 1 are being subjected. This station 3 also possesses a thrust control member 20 that co-operates with the device 21 as described above, to produce the variable feedback force values.

By means of the invention, a return haptic effect of feeding back force is obtained that is adapted to hybrid helicopters 1, and it is applied in particular to the pitching controls, and to a lesser extent to the roll controls.

In addition, selecting haptic feedback for the controls of the hybrid helicopter 1 in accordance with the invention is well adapted to moving the manual flight control devices (comparable to the device 21) in order to guarantee piloting that is particularly accurate and comfortable.

Because of the increased compliance with the flight limits of a hybrid helicopter 1 in accordance with the invention, such as load factor, the safety in flight of this advance type of helicopter is further improved.

Another advantage obtained for the hybrid helicopter 1 of the invention is increased lifetime for the aircraft, given that the components concerned are subjected to less damage, and in particular its airfoil surfaces and their control mechanisms.

Furthermore, increased reliability is obtained for the hybrid helicopter 1 of the invention associated with the fact that haptic feedback appropriate for the manual flight control devices is independent of similar functions that are performed by the autopilot.

It should also be observed that the term "manual" should be understood broadly, i.e. as stemming from a movement made by the pilot, and should not be limited to the literal sense of hand movements.

Embodiments of the invention that are not shown also relate to providing haptic feedback to the rudder pedals for controlling flight in yaw, and which should also be considered as constituting a manual flight control device, just like the stick referenced 21.

Similarly, the invention enables haptic feedback to be applied to a flight control device 21 in the form of a lever for controlling the collective pitch of the blades 5 of the rotary wing 4 of the hybrid helicopter 1.

Naturally, the present invention may be subjected to numerous variations as to its implementation. Although several implementations are described, it will readily be understood that it is not conceivable to identify exhaustively all possible implementations. It is naturally possible to envisage replacing any of the means described by equivalent means without going beyond the ambit of the present invention.

What is claimed is:

1. A method of providing haptic feedback for operating at least one manual flight control device suitable for making adjustments to at least one airfoil surface of a hybrid helicopter via a flight-attitude changing linkage that is provided with power assistance, the hybrid helicopter comprising at least a fuselage, a rotary wing and a fixed wing having anti-torque differential thrust propulsion arrangements distributed symmetrically thereon on either side of the fuselage, said arrangements being controlled between minimum and maximum thrust values by a manual thrust control member, the hybrid helicopter further including an autopilot suitable for acting on the power assistance for adjusting cyclic pitch of the blades of the rotary wing, said operations of said control device being damped by haptic feedback defined according to a predetermined damping force relationship, wherein said damping force relationship for operating the manual flight control device is predetermined as a function of an instantaneous load factor of the hybrid helicopter in such a manner that this instantaneous load factor is maintained between its minimum and maximum limit values in proportion to a position of said thrust control member between its minimum and maximum thrust values.

2. A method according to claim 1, wherein said manual control device with damping of its operation acts on the pitch attitude of the hybrid helicopter, said airfoil surfaces comprising blades of a rotary wing, with the cyclic pitch thereof being adjusted.

3. A method according to claim 2, wherein said adjustments of the cyclic pitch of the blades of the rotary wing of the hybrid helicopter are obtained via said power assistance, said assistance being defined at least in part by said autopilot independently of said predetermined damping force relationship for operating the manual flight control device; operations applied to said manual control thrust member acting either directly or via power assistance on the adjustment of the thrust, this adjustment being delivered to an autopilot which then responds by adapting at least one flight parameter such as an engine speed for the propulsion arrangements, which adaptation results in a return to a new assistance setpoint being defined for adjusting the cyclic pitch of the blades of the rotary wing, in a manner that is indirect, and thus independent.

4. A method according to claim 1, wherein said manual control device with damping of its operation acts on the roll attitude of the hybrid helicopter, said airfoil surfaces comprising blades of a rotary wing, with the cyclic pitch thereof being adjusted.

5. A method according to claim 1, wherein said manual control device with damping of its operation acts on the yaw attitude of the hybrid helicopter, said airfoil surfaces forming parts of the thrust arrangements and/or of a set of stabilizer and rudder control surfaces.

6. A method according to claim 1, wherein said predetermined damping force relationship for operating said manual control device is obtained by applying an opposing torque exerted by a damper on said attitude changing linkage using a damping coefficient of said damper that is variable in application of another predetermined damping coefficient variation relationship as a function of the stroke of the mean collective pitch of blades of propellers of said thrust arrangements.

7. A method according to claim 6, wherein when said manual control member is ordering thrust at said minimum value or even zero thrust, the collective pitch of said propellers of the propulsion arrangements is at a minimum and said damping coefficient applied by the damper defined according to the predetermined damping coefficient variation relationship lies substantially in the range 2.5 Nm/rd/s to 3.5 Nm/rd/s, while the damping coefficient applied by the damper when said control member is ordering thrust at said maximum value is itself at a maximum, said damping coefficient applied by the damper lying substantially in the range 13.5 Nm/rd/s to 14.5 Nm/rd/s.

8. A method according to claim 1, wherein said minimum and maximum limit values of the load factor, said minimum and maximum thrust values, or a combination thereof are calibrated as a function of limit states for the hybrid helicopter tending automatically to pitch up.

9. A hybrid helicopter including at least one damper, wherein the helicopter includes at least one damper motor; a haptic feedback system for operating at least one manual flight control device being suitable to adjust a cyclic pitch of the blades of a rotary wing of the hybrid helicopter via power assistance, said hybrid helicopter comprising at least a fuselage, said rotary wing, and a fixed wing having anti-torque differential thrust propulsion arrangements distributed symmetrically thereon on either side of the fuselage, a manual thrust control member being provided so that operating it controls said thrust arrangements between maximum and minimum thrust positions, said hybrid helicopter further including an autopilot functionally connected to the power assistance so as to participate in said cyclic pitch adjustment of said blades of the rotary wing, and said manual control device being arranged in such a manner that operating it is damped by haptic feedback defined according to a predetermined damping force relationship; and in order to predetermine said predetermined damping force relationship in proportion to a position of said thrust control member between the minimum and maximum thrust values, a flight-attitude changing linkage to which said damping force relationship is to be applied is incorporated in said hybrid helicopter in parallel with another flight-attitude changing linkage for changing thrust and provided with said control member.

10. A hybrid helicopter according to claim 9, wherein the operation haptic feedback system includes assistance dedicated to said flight-attitude changing linkage and in parallel, assistance dedicated to said other flight-attitude changing linkage that acts on thrust, the flight control assistance being functionally connected firstly to a manual control device such as a lever and secondly to at least one airfoil surface of the rotary wing via swashplates for controlling the cyclic pitch of the blades of said rotary wing, while in parallel, said thrust control assistance is functionally connected firstly to said control member and secondly to mechanisms for adjusting the pitch of the blades of propellers of said thrust arrangements.

11. A hybrid helicopter according to claim 9, wherein said other flight-attitude changing linkage for controlling thrust includes at least two pivoting crank hinges and a position sensor at one of said hinges that is functionally connected to said control member in such a manner as to produce an electric signal representative of the control of said member between said minimum and maximum thrust values; for example the position sensor is a rotary variable differential transformer sensor.

12. A hybrid helicopter according to claim 9, wherein said flight-attitude changing linkage includes at least two pivoting crank hinges and at one said hinges at least one damper of operations of said manual flight control device, the damper being in the form of an alternator or motor connected in such a manner as to deliver electricity to an opposing electronic circuit connected to the terminals of said damper in order to produce a back emf proportional to the speed of rotation of said hinge receiving the damper.

13. A hybrid helicopter according to claim 9, wherein said manual flight control device is functionally coupled to an operation speed sensor adapted to produce an operation speed signal proportional to the instantaneous speed at which said manual flight control device is being actuated, said speed signal then being incorporated as a parameter in the predetermined damper relationship.

14. A hybrid helicopter according to claim 13, wherein said feedback system includes at least one sensor for sensing the position of said manual control member, a damper for damping operation of said manual control device, and a speed sensor, which sensors and damper are functionally connected to define the damping directly as a function of the predetermined damping force relationship.

15. A hybrid helicopter according to claim 9, wherein the system includes a computer having connected thereto at least one position sensor for sensing the position of said control member, and a damper for damping operations of said manual flight control device, and optionally a speed sensor for sensing the speed of said control member.

16. A hybrid helicopter according to claim 9, wherein it is a drone having a piloting station that is remote and not on board, and that includes at least one manual flight control device with haptic feedback and a manual thrust control member of instantaneous position that is taken into consideration to determine the force relationship.

* * * * *